United States Patent [19]

Lafferty, Sr.

[11] 4,166,708

[45] Sep. 4, 1979

[54] COUPLING FOR QUICK CONNECTION OF ELEMENTS

[75] Inventor: Gary S. Lafferty, Sr., Franklin, Wis.

[73] Assignee: Milwaukee Electric Tool Corporation, Brookfield, Wis.

[21] Appl. No.: 740,048

[22] Filed: Nov. 8, 1976

Related U.S. Application Data

[63] Continuation-in-part of Ser. No. 619,944, Oct. 6, 1975, abandoned.

[51] Int. Cl.² ............................................. F16B 7/18
[52] U.S. Cl. .................................. 403/342; 403/344; 403/14
[58] Field of Search ................ 403/342, 311, 344, 13, 403/14; 85/51, 33; 285/362, 377, 387, 373, 419

[56] References Cited

U.S. PATENT DOCUMENTS

| | | | |
|---|---|---|---|
| 609,509 | 8/1898 | Jensen | 285/387 |
| 859,093 | 7/1907 | Masters | 403/344 |
| 1,609,566 | 12/1926 | Mayo | 285/362 |
| 1,652,272 | 12/1927 | Dawson | 85/51 X |
| 2,476,586 | 7/1949 | Darash | 85/51 X |
| 2,927,809 | 3/1960 | Smelko | 403/197 |
| 3,162,084 | 12/1964 | Wurzel | 85/51 X |
| 3,229,998 | 1/1966 | Pennington | 285/419 |
| 3,428,337 | 2/1969 | Read | 85/33 X |
| 3,684,993 | 8/1972 | Hazen | 151/25 R |
| 3,857,588 | 12/1974 | Curtin | 285/419 X |
| 3,934,902 | 1/1976 | McNamee | 85/33 X |

FOREIGN PATENT DOCUMENTS

| | | | |
|---|---|---|---|
| 9853 | of 1907 | Denmark | 285/362 |
| 116301 | 12/1900 | Fed. Rep. of Germany | 403/342 |
| 1144542 | 2/1963 | Fed. Rep. of Germany | 85/33 |
| 774641 | 9/1934 | France | 285/419 |
| 4351 | of 1904 | United Kingdom | 285/377 |
| 4272 | of 1907 | United Kingdom | 285/377 |

*Primary Examiner*—Andrew V. Kundrat

[57] ABSTRACT

A detachable coupling consisting of two mating halves which when detachably interconnected form a ring which is free to rotate but is restrained axially with respect to elements to be connected.

2 Claims, 13 Drawing Figures

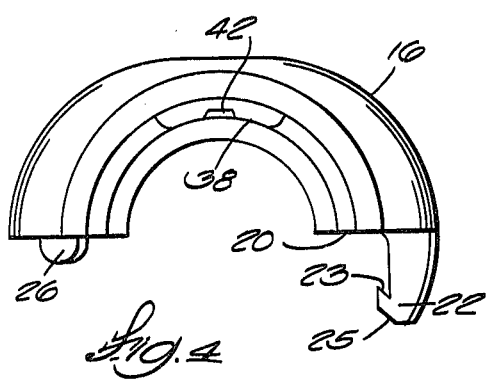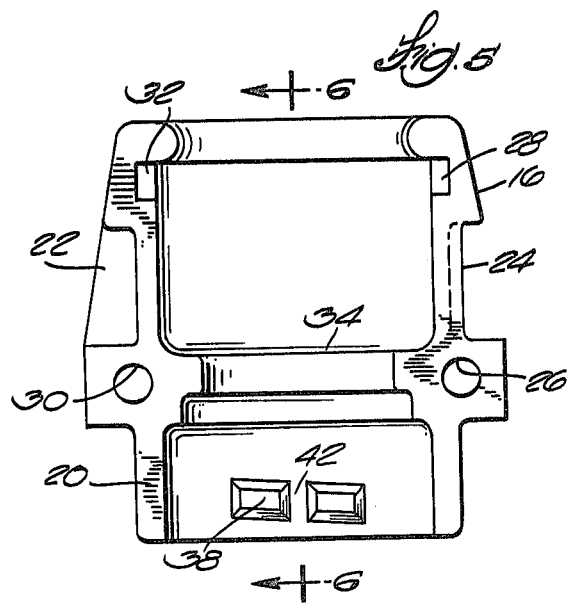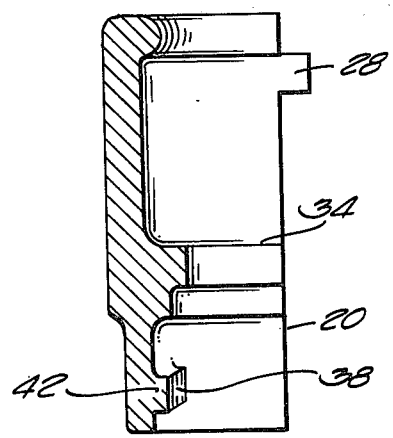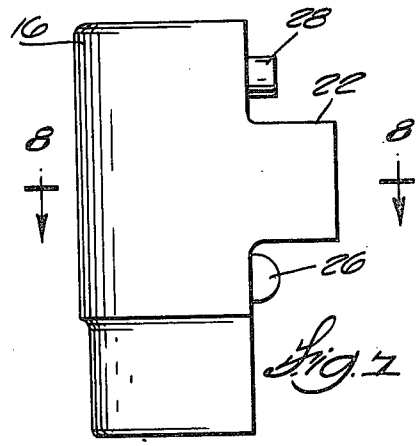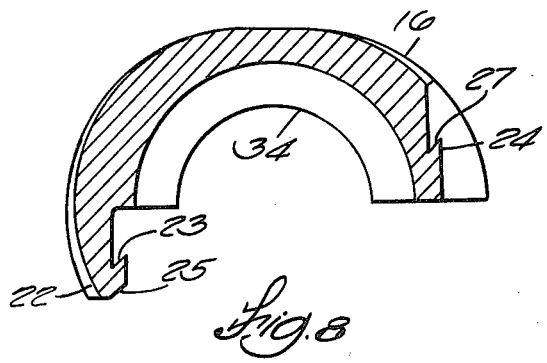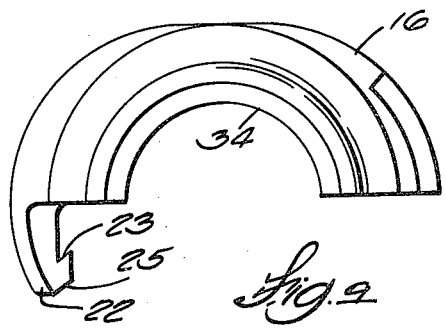

COUPLING FOR QUICK CONNECTION OF ELEMENTS

CROSS-REFERENCE

This is a continuation in part of U.S. Ser. No. 619,944, filed Oct. 6, 1975 and now abandoned.

DEFINITIONS

The words element or elements as used herein include (1) The interconnectible electrical terminals in a housing on an electric cord set or in a housing on a power operated tool and in the housing on an electric cord set for such tool, and (2) Any structural members which are to be connected.

The word coupling is synonymous with and includes the words ring, retaining ring, nut, and retaining nut.

The words mating halves are used to define a pair of halves which are joined together along a longitudinal plane to form a coupling.

BACKGROUND OF THE INVENTION

1. Field of the Invention

This invention relates to a coupling to form a detachable connection between two elements. The object of this invention is to provide a coupling consisting of a pair of separate mating halves which are radially moved into interconnected position, and held together by integral means formed therein without the necessity of additional fastening means. Another object is to provide a coupling which is of simple construction, easy to use and economic to manufacture and assemble.

2. Description of the Prior Art

A search based on this invention uncovered the following U.S. patents:

U.S. Pat. No. 1,001,042
U.S. Pat. No. 1,722,816
U.S. Pat. No. 2,106,595
U.S. Pat. No. 2,464,893
U.S. Pat. No. 2,563,712
U.S. Pat. No. 2,563,762
U.S. Pat. No. 2,730,685
U.S. Pat. No. 2,776,385
U.S. Pat. No. 2,784,385
U.S. Pat. No. 3,001,167
U.S. Pat. No. 3,145,675
U.S. Pat. No. 3,368,090
U.S. Pat. No. 3,400,627
U.S. Pat. No. 3,588,783
U.S. Pat. No. 3,601,764
U.S. Pat. No. 3,617,985
U.S. Pat. No. 3,649,956
U.S. Pat. No. 3,684,993
U.S. Pat. No. 3,808,580
U.S. Pat. No. 3,843,224

However, none of the aforementioned U.S. patents show or describe a coupling which consists of two separate mating halves and moved radially into interconnected position along a longitudinal plane and held together by integral means thereon without the necessity of additional fastening means which coupling is free to rotate with respect to but is restrained axially with respect to the elements to be connected by such coupling.

U.S. Pat. Nos. 3,041,088, 3,142,503 and 3,934,902 each teach a method of providing an axially restrained but rotable coupling; however, additional means are required to lock the mating halves in interconnection, for instance: the undercut threads of U.S. Pat. No. 3,041,088; the bolts of 3,142,503; and the threaded member 50 of U.S. Pat. No. 3,934,902. Belgium Pat. No. 558,224 only teaches a pair of mating halves hingedly interconnected at one edge by an integral hinge 8. This Belgium patent is very similar to U.S. Pat. No. 3,041,088. None of the prior art known to applicant shows integral angled latching surfaces. The foreign Belgium patent is not clear as to the angulation of any of the cooperating ledges 21 and 24.

SUMMARY OF THE INVENTION

This invention relates to a coupling consisting of two separate mating halves which are radially moved into interconnected position. The halves are provided with angled latching surfaces and cam surfaces. Each mating half may be of identical symmetrical complimentary construction. When the mating halves are interconnected, the coupling formed by such mating halves may be rotated with respect to a member but is axially restrained with respect to the members to be connected by the coupling and no additional means are required to hold said halves in interconnected position.

BRIEF DESCRIPTION OF THE DRAWINGS

FIG. 4 is a view in end elevation of the mating half shown in FIG. 3;

FIG. 5 is a plan view of the inner side of the mating half shown in FIG. 4;

FIG. 6 is a sectional view taken on the line 6—6 of FIG. 5;

FIG. 7 is a view in side elevation of the mating half shown in FIG. 4;

FIG. 8 is a sectional view taken on the line 8—8 of FIG. 7;

FIG. 9 is a view in end elevation of right-hand end of FIG. 7;

DESCRIPTION OF THE PREFERRED EMBODIMENTS

Figure 10:
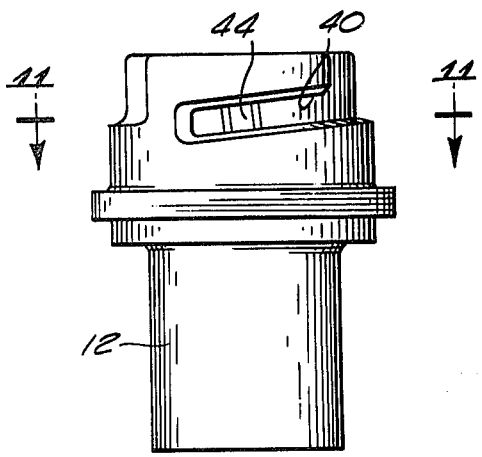
FIG. 10 is a view in end elevation of the housing which is mounted on the handle of the electrical power operated tool shown in FIG. 1.
Figure 11:
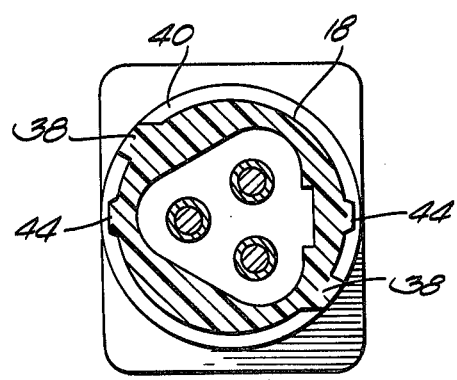
FIG. 11 is a sectional view taken on the lines 11—11 of FIG. 10 with the coupling and its element on the electrical cord connected.

Referring to the drawings by reference numerals, the invention for illustration purposes is shown incorporated in a cord set which is detachably secured to a housing 12 (see FIGS. 10 and 11), which housing is mounted in the pistol grip 10 of a portable electric power drill and contains a terminal element assembly of standard design. Since the electric motor, switch mechanism, the gear casing, and output mechanism are well known components which are not essential to an understanding of the present invention, they are omitted from the drawings and are not described. The coupling of this invention can also be employed to detachably secure other than a cord set to a tool and may, for example, be used to detachably secure two electric cord extensions or other parts which need to be detachably secured together such as a handle to a body to be guided by the handle.

Figure 2:
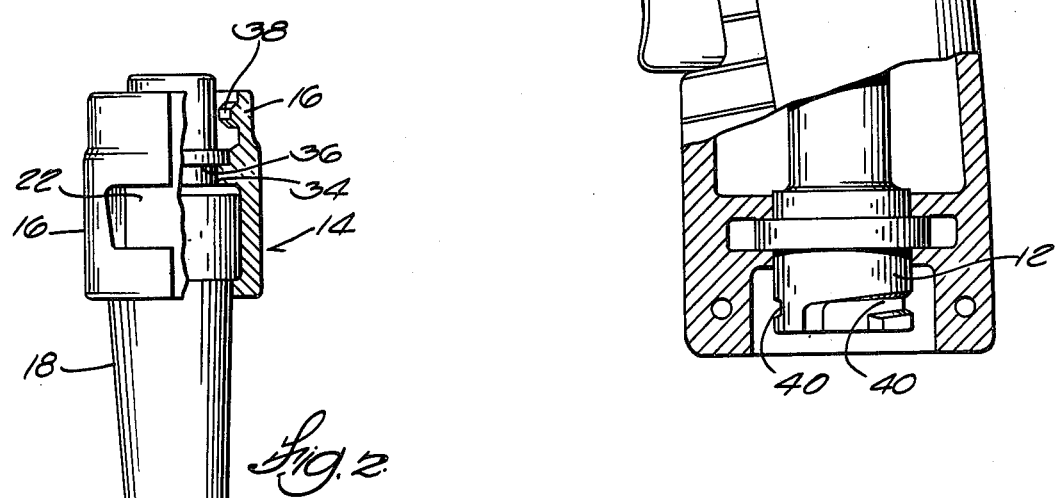
FIG. 2 is a view in side elevation and partial section showing the end of an electric cord element having a housing for a terminal assembly on which housing is mounted a coupling embodying the present invention.
Figure 3:
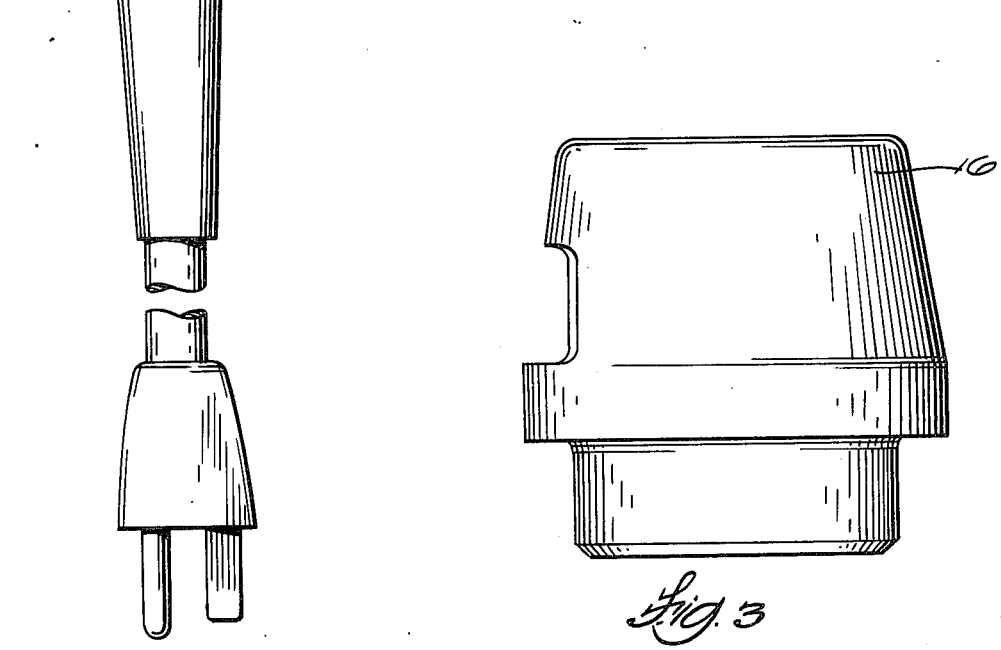
FIG. 3 is a side elevation of one of the two mating halves of the coupling shown in FIG. 2.

As shown in FIG. 2, a completed detachable coupling embodying a first embodiment of the invention is shown generally after the mating halves have been locked together to surround the housing 18 for a terminal assembly. Each mating half 16 of the first embodiment (see FIGS. 2, 3, 4, 5, 7, 8 and 9) is molded from insulating material of any practical choice such as thermosetting plastic or glass filled nylon.

Each mating half 16 has axially extending edges 20, which edges are seated together along a longitudinal plane to form the assembled coupling. On one edge of each half there is integrally formed a locking finger 22 (see FIGS. 2, 4, 5, 7, 8 and 9) which finger has an angled locking surface 23 and as the halves are forced radially together, such finger rides on a camming ramp 25 on the finger 22 on and over the edge of the ledge 24 (see FIGS. 5 and 8) so that angled locking surface 23 engages with an angled surface 27 on the ledge 24 (see FIG. 8).

In order to axially align the halves 16 as snapped together, one edge of each half has a pin 26 and tab 28 (see FIGS. 4, 5 and 7) while the other edge of such half has a complimentary hole 30 and a complimentary slot 32 (see FIG. 5). The pin and tab and the hole and slot are axially spaced so that when the pin and tab in one half is seated in the hole and slot on the other half, the halves are fixedly maintained against axial and lateral sliding relative movements, thus keeping the locking surfaces on the finger and ledge in proper locked engagement without any fastening means in addition to the integral means of fingers 22.

To keep the coupling against axial displacement and yet permit relative rotation for interlocking of the elements to be connected, each mating half has an annularly extending internal ringlike shoulder 34 (see FIGS. 2, 5, 6 and 8) which engages in an annular groove 36 on the housing 18 (see FIG. 2). When the coupling 14 is threaddedly engaged with the housing 12, the axial lock so formed causes tensil loads to be absorbed by such coupling and the housings 12 and 18 for the terminal assemblies instead of such loads being transmitted to the terminal assemblies and their electrical connections.

Figure 1:
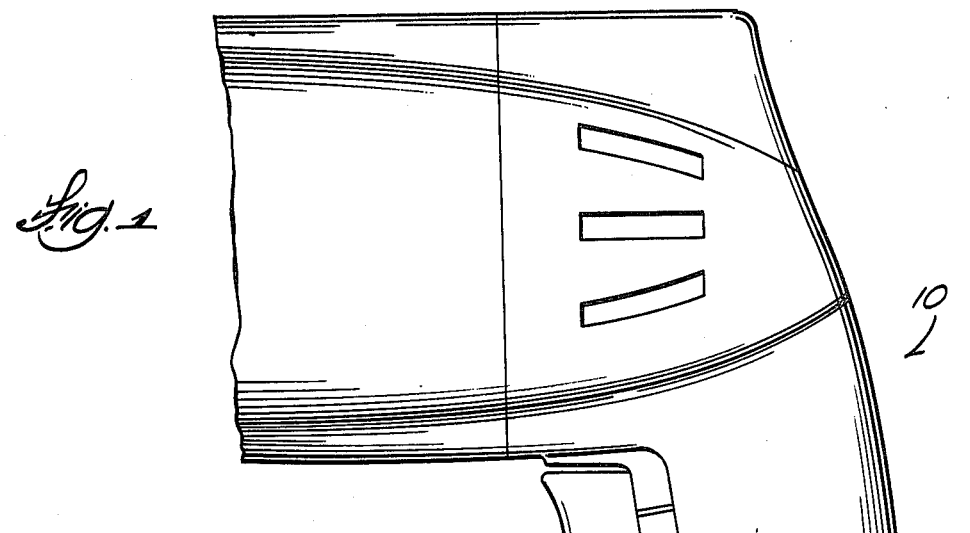
FIG. 1 is a fragmentary view partly in side elevation and partly in section illustrating an electrical power operated tool to which an electrical cord element is secured by a coupling embodying the present invention.

The locking of the element to be connected by the coupling is accomplished by rotation of such coupling from unlocked to locked position. There is an internal thread or cam section 38 (see FIGS. 1, 2, 4, 5 and 6) within each half. The sections 38, upon such rotation of the coupling nut 14 threaddedly interlock with a complimentary groove 40 (see FIGS. 1 and 10) to draw and hold together the housings 12 and 18 and the terminal assemblies to be connected. A notch or notches 42 (see FIGS. 4 and 5) on cam 38 frictionally receives a tooth or teeth 44 in the groove 36 (see FIGS. 10 and 11) to prevent accidental unthreading of the coupling.

Figure 12:
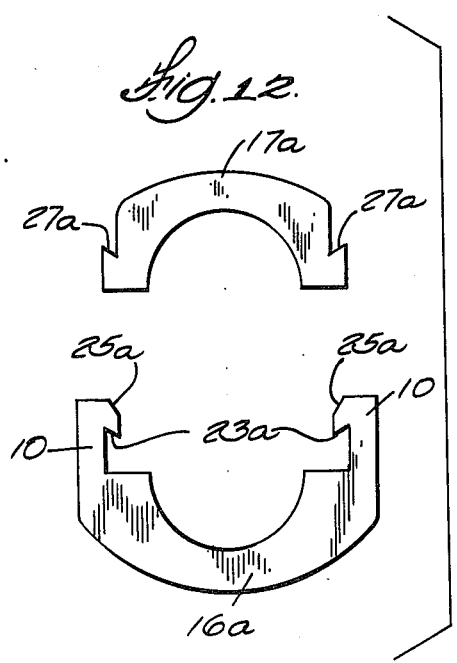
FIG. 12 is a view in end elevation of a pair of separated mating halves of a second embodiment of this invention with the halves separated.
Figure 13:
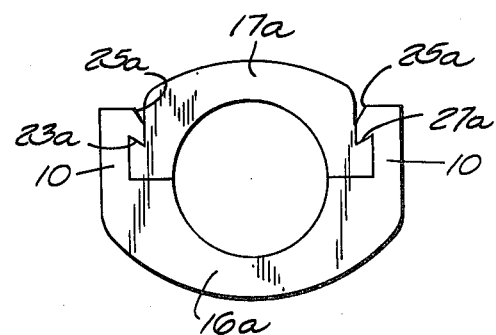
FIG. 13 is a view in end elevation of the halves shown in FIG. 12 after the halves have been radially positioned and interlocked.

A second embodiment of the mating halves of this invention is shown in FIGS. 12 and 13. In this embodiment the halves are of different shape and are not identical or symmetrical with respect to one another. In this embodiment, the half 16A only has a pair of oppositely positioned angled locking surfaces 23A and camming ramps 25. While the other mating half 17A has a pair of oppositely positioned angled locking surfaces 27A which are engaged by the surfaces 23A as the halves are moved radially together. In other aspects, the mating halves 16A and 17A have the same constructional features as the mating half 16.

In the first embodiment, the camming ramp 25 provides a tamper proof arrangement because force on each ramp which, in the assembled position, faces inwardly in the same angular position merely tends to rotate the coupling. However, in the second embodiment, the camming ramps 25A which, in the assembled position, face inwardly in an opposite angular direction and provide for easily disassembly of the mating halves 16A and 17A.

I claim:

1. A quick-connect coupling comprising
   a generally tubular coupler axially divided on a plane intersecting the coupler axis to form two coupler halves meeting on confronting edges,
   complimentary locking means on the two halves having interengaging sloping locking surfaces which are engaged by bringing the two halves together on a line of motion perpendicular to said plane and which when engaged hold the halves together with said edges in contact and which positively resists separation of said halves on said line of motion,
   said locking means comprising complimentary cam and ramp surfaces which are deflected as the halves are brought together and have reverse contours which engage when the confronting edges are in engagement,
   each of said halves including in addition to said locking means a pin and a tab on one of said edges and a hole and a slot on the opposite edge.

2. A quick-connect coupling comprising
   a generally tubular coupler axially divided on a plane intersecting the coupler axis to form two coupler halves meeting on confronting edges,
   complimentary locking means on the two halves having interengaging sloping locking surfaces which are engaged by bringing the two halves together on a line of motion perpendicular to said plane and which when engaged hold the halves together with said edges in contact and which positively resists separation of said halves on said line of motion,
   said locking means comprising complimentary cam and ramp surfaces which are deflected as the halves are brought together and have reverse contours which engage when the confronting edges are in engagement each said halves includes in addition to said locking means a pin and a tab on one of said edges; and a hole and a slot on the opposite edge,
   each of said halves including an internal part which upon rotation of said coupling is adapted to lock with an element to be interconnected with another element to be held by said coupling, and further including means restricting axial movement of said coupling with respect to such another element to be held by said coupling.

* * * * *